(12) United States Patent
Kawarada et al.

(10) Patent No.: US 9,871,365 B2
(45) Date of Patent: Jan. 16, 2018

(54) PROTECTIVE RELAY SYSTEM AND PROTECTIVE RELAY DEVICE

(71) Applicant: Kabushiki Kaisha Toshiba, Minato-ku (JP)

(72) Inventors: Akira Kawarada, Fuchu (JP); Takahiro Mori, Fuchu (JP); Michihiko Inukai, Yokohama (JP); Hideaki Sugiura, Fuchu (JP); Tomonori Nishida, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 253 days.

(21) Appl. No.: 14/653,148

(22) PCT Filed: Dec. 16, 2013

(86) PCT No.: PCT/JP2013/083566
§ 371 (c)(1),
(2) Date: Jun. 17, 2015

(87) PCT Pub. No.: WO2014/112264
PCT Pub. Date: Jul. 24, 2014

(65) Prior Publication Data
US 2015/0333495 A1    Nov. 19, 2015

(30) Foreign Application Priority Data
Jan. 15, 2013 (JP) ................................. 2013-004875

(51) Int. Cl.
*H02H 1/00* (2006.01)
*G05B 15/02* (2006.01)
(Continued)

(52) U.S. Cl.
CPC .......... *H02H 1/0092* (2013.01); *G05B 15/02* (2013.01); *G06F 1/12* (2013.01); *G06F 7/582* (2013.01); *H02H 3/28* (2013.01); *H02H 7/261* (2013.01)

(58) Field of Classification Search
CPC ........ H02H 1/0092; H02H 3/28; H02H 7/261; G05B 15/02; G06F 1/12; G06F 7/582
(Continued)

(56) References Cited

U.S. PATENT DOCUMENTS

| 4,547,850 A | 10/1985 | Genma |
| 4,612,594 A | 9/1986 | Yamaura et al. |

(Continued)

FOREIGN PATENT DOCUMENTS

| CN | 1489819 A | 4/2004 |
| CN | 101536281 A | 9/2009 |

(Continued)

OTHER PUBLICATIONS

International Search Report dated Jan. 14, 2014 in PCT/JP13/083566 Filed Dec. 16, 2013.

(Continued)

*Primary Examiner* — Thienvu Tran
*Assistant Examiner* — Kevin J Comber
(74) *Attorney, Agent, or Firm* — Oblon, McClelland, Maier & Neustadt, L.L.P.

(57) ABSTRACT

A protective relay system includes plural protective relay devices protecting a power system based on electrical quantity data from the power system, and a communication between the protective power devices is performed via a network. The protective relay device includes a clock unit periodically clocking a timing at which sampling is performed on an electrical quantity of the power system, a relay computing unit performing a relay computation based on the (Continued)

electrical quantity data having undergone the sampling and electrical quantity data received via the network, a random-number creating unit creating a random number, and a synchronization-frame processing unit setting a timing of sending a synchronization frame to another protective relay device via the network based on the random number created by the random-number creating unit.

8 Claims, 5 Drawing Sheets

(51) Int. Cl.
    *G06F 1/12*     (2006.01)
    *G06F 7/58*     (2006.01)
    *H02H 3/28*     (2006.01)
    *H02H 7/26*     (2006.01)

(58) Field of Classification Search
    USPC .......................................................... 361/64
    See application file for complete search history.

(56) References Cited

U.S. PATENT DOCUMENTS

| | | |
|---|---|---|
| 8,107,205 B2 | 1/2012 | Adachi |
| 2003/0161084 A1 | 8/2003 | Potts et al. |
| 2005/0280965 A1 | 12/2005 | Lee et al. |
| 2010/0302697 A1 | 12/2010 | Adachi |
| 2011/0158263 A1 | 6/2011 | Karino |

FOREIGN PATENT DOCUMENTS

| | | |
|---|---|---|
| EP | 0 135 110 A2 | 3/1985 |
| JP | 60-39310 A | 3/1985 |
| JP | 2010-56947 A | 3/2010 |

OTHER PUBLICATIONS

Extended European Search Report dated Nov. 22, 2016 in Patent Application No. 13872248.3.

PROTECTIVE RELAY SYSTEM AND PROTECTIVE RELAY DEVICE

CROSS-REFERENCE TO RELATED APPLICATIONS

This application is based upon and claims the benefit of priority from Japanese Patent Application No. 2013-004875, filed on Jan. 15, 2013, the entire contents of which are incorporated herein by reference.

TECHNICAL FIELD

Embodiments of the present disclosure relate to a protective relay system and a protective relay device.

BACKGROUND ART

Conventionally, protective relay systems are utilized to protect power system facilities, such as a power transmission line, a bus bar, and a transformer constructing a power system, by detecting and eliminating an accident that occurs in the power system facilities. For example, as to a protective relay system that protects a power transmission line, there is a technology which provides a protective relay device at a section end of the power system, connects respective protective relay devices via transmission channels, and detects an accident based on electrical quantity information at each terminal.

Among such protective relay devices, a current differential relay device that protects a power transmission line obtains current value information from the local terminal, and transmits the current value information to the terminal of a communication-partner device via a transmission channel. Next, the communication-partner protective relay device that has received the current value information through the terminal detects an accident of the power transmission line based on a difference between current value information obtained from the local terminal and the current value information received via the transmission channel. A time (sampling time) at each terminal of the current difference relay device needs to be synchronized highly precisely.

For a transmission between the protective relay devices in conventional protective relay systems, conventionally, microwaves of substantially 54 Kbps to 1.5 Mbps or optical lines are applied, and a highly precise synchronization is realized by transmitting synchronization frames with each other. In recent years, application of a general-purpose network like Ethernet (registered trademark) which is faster than microwaves and optical lines, and which is advantageous in maintenance and costs is being examined. According to a protective relay system utilizing a general-purpose network, a communication is performed among plural protective relay devices via communication relaying devices. Hence, the process timing of a synchronization frame in the communication relaying device may overlap the process timings of other frames, and the forwarding time of the synchronization frame may be delayed.

When the forwarding time of the synchronization frame is delayed, a difference is caused in the outward transmission time between the protective relay devices and the return transmission time between the devices, and thus the synchronization precision decreases. When the synchronization precision decreases, the current differential relay device performs a differential computation at a different sampling timing, and thus a false operation may occur.

[Related Technical Documents]
[Patent Documents]
[Patent Document 1] JP 2010-56947 A

SUMMARY

Hence, it is an objective of embodiments of the present disclosure to provide a protective relay system and a protective relay device which can realize a time synchronization highly precisely between devices.

Embodiments of the present disclosure relate to a protective relay system that includes plural protective relay devices protecting a power system based on electrical quantity data from the power system, and a communication between the protective power devices is performed via a network. The protective relay device includes a clock unit that periodically clocks a timing at which sampling is performed on an electrical quantity of the power system, a relay computing unit that performs a relay computation based on the electrical quantity data having undergone the sampling and electrical quantity data received via the network, a random-number creating unit that creates a random number, and a synchronization-frame processing unit that sets a timing of sending a synchronization frame to another protective relay device via the network based on the random number created by the random-number creating unit.

DETAILED DESCRIPTION

Protective relay systems and protective relay devices according to embodiments of the present disclosure will be explained with reference to the drawings.

First Embodiment

Figure 1:
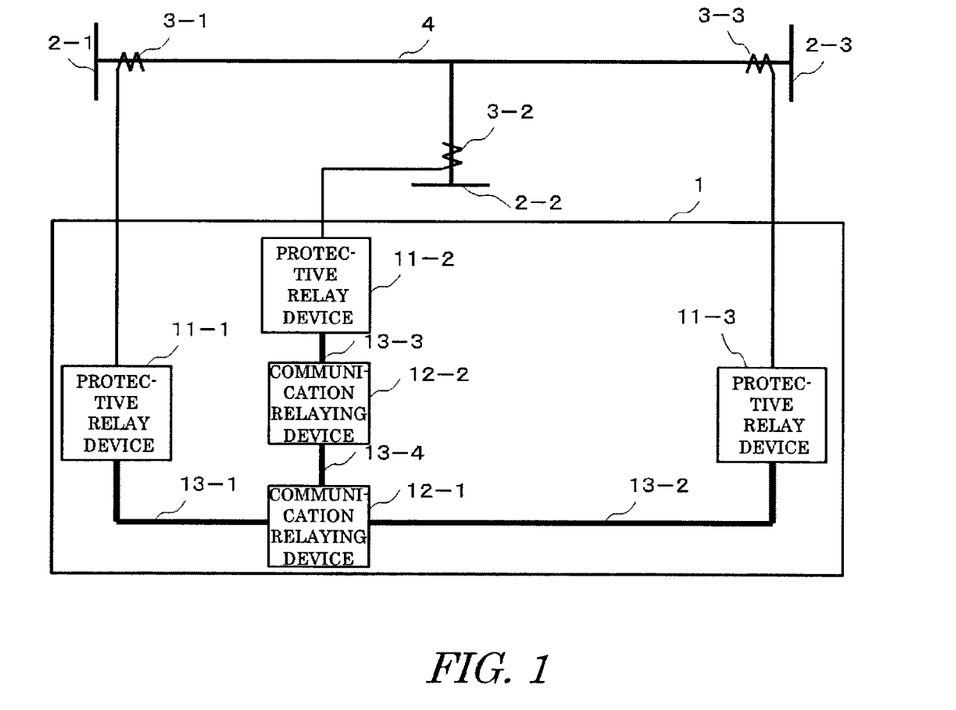
FIG. 1 is a block diagram illustrating a structure of a protective relay system according to a first embodiment.

A structure of a protective relay system according to a first embodiment of the present disclosure will be explained with reference to FIG. 1. FIG. 1 is a block diagram illustrating a protective relay system that protects a three-terminal power transmission line.

A protective relay system 1 includes protective relay devices 11-1 to 11-3, communication relaying devices 12-1 and 12-2, and networks 13-1 to 13-4.

The protective relay devices 11-1 to 11-3 are connected with current transformers 3-1 to 3-3, respectively, provided near to terminals 2-1 to 2-3, and obtain electrical quantity data. In addition, the protective relay devices 11-1 to 11-3 perform communication through the networks 13-1 to 13-4 and the communication relaying devices 12-1 to 12-2, and exchange data frames. In this case, the data frames exchanged among the protective relay devices 11-1 to 11-3 are an electrical quantity frame that contains the electrical quantity data obtained from the current transformers 3-1 to 3-3, and a synchronization frame to establish a time synchronization among the respective protective relay devices 11-1 to 11-3.

Figure 2:
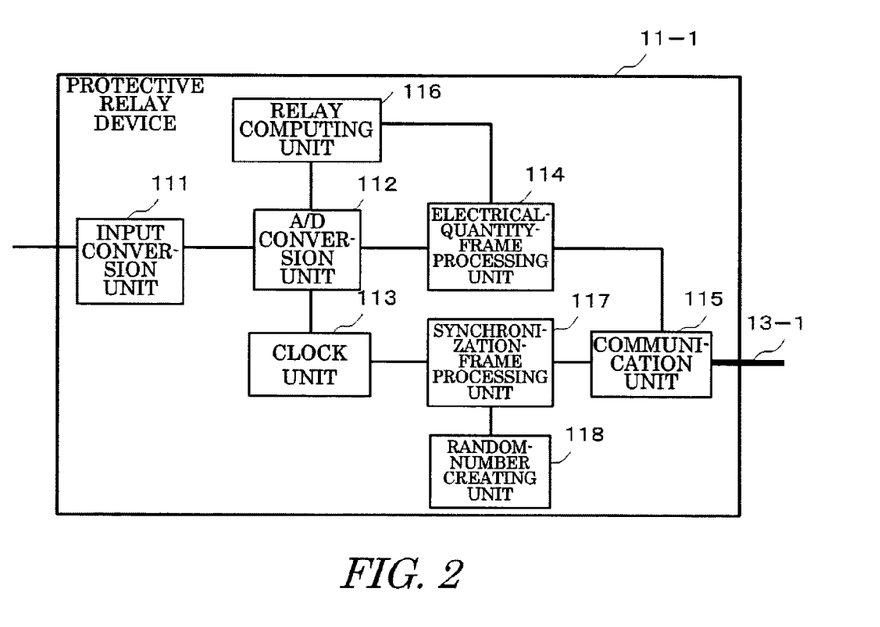
FIG. 2 is a functional block diagram illustrating an internal structure of a protective relay device according to the first embodiment.

An internal structure of the protective relay device 11-1 will be explained with reference to FIG. 2. FIG. 2 is a functional block diagram illustrating a functional structure of the protective relay device 11-1.

The protective relay device 11-1 includes an input conversion unit 111, an analog-digital conversion unit (hereinafter, referred to as an A/D conversion unit) 112, a clock unit 113, an electrical-quantity-frame processing unit 114, a communication unit 115, a relay computing unit 116, a synchronization-frame processing unit 117, and a random-number creating unit 118. The protective relay devices 11-2, 11-3 placed at the terminals 2-2, 2-3 both employ the same structure as that of the protective relay device 11-1. Hence, the explanation thereof will be omitted.

Analog data that is the electrical quantity data obtained from the current transformer 3-1 is input to the input conversion unit 111.

The A/D conversion unit 112 performs sampling on the electrical quantity data that is the analog data input to the input conversion unit 111 at a sampling timing periodically clocked by the clock unit 113, and converts the analog data to digital data.

The electrical-quantity-frame processing unit 114 transmits, to the protective relay devices 11-2 and 11-3, the electrical quantity data that is converted to the digital data by the A/D converter 112 as an electrical quantity frame via the communication unit 115, the network 13-1, and other communication relaying devices. In addition, the electrical-quantity-frame processing unit 114 receives, via the network 13-1 and the communication unit 115, the electrical quantity frames that are digital data transmitted from the protective relay devices 11-2 and 11-3. The electrical quantity frames received in this case include electrical quantity data obtained from the current transformers 3-2 and 3-3 at the terminals 2-2 and 2-3.

The relay computing unit 116 performs current differential computation based on the electrical quantity data of the terminal 2-1 having undergone digital conversion by the A/D conversion unit 112, and the electrical quantity data of the terminals 2-2 and 2-3 contained in the electrical quantity frames received by the electrical-quantity-frame processing unit 114.

The synchronization-frame processing unit 117 sends, to the protective relay devices 11-2 and 11-3, synchronization frames via the communication unit 115 and the network 13-1. A timing (TO) at which the synchronization frame is sent is within a fluctuation allowable time (T2) after a certain period of time (T1) from the sampling timing, and is set based on a random number created by the random-number creating unit 118. In addition, the synchronization-frame processing unit 117 receives the synchronization frames from the protective relay devices 11-2 and 11-3 via the network 13-1 and the communication unit 115, and corrects the local clock unit 113.

Figure 3:
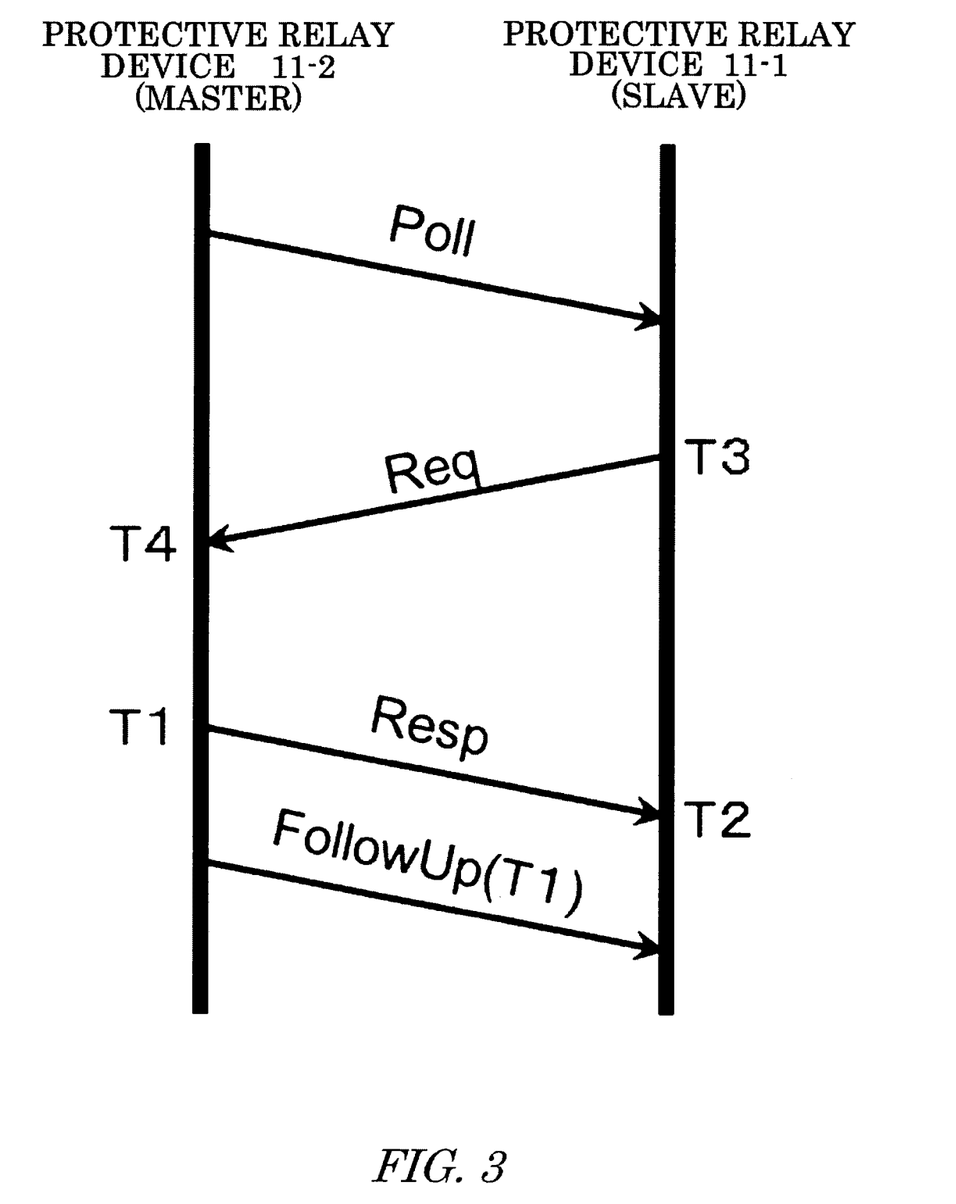
FIG. 3 is a diagram illustrating an operation when a clock unit 113 is synchronized according to the first embodiment.

An explanation will be given of operations of the protective relay devices 11-1 and 11-2 when the clock unit 113 is corrected with reference to FIG. 3. FIG. 3 illustrates an operation when the protective relay device 11-1 serves as a slave device, the protective relay device 11-2 serves as a master device, and an unillustrated clock unit of the master device is synchronized with the clock unit 113 of the slave device. The synchronization frames exchanged between the protective relay devices 11-1 and 11-2 can be divided into four kinds that are a polling (Poll) frame, a synchronization requesting (Req) frame, a synchronization responding (Resp) frame, and a sending time notifying (FollowUP) frame.

The Poll frame is a signal which is transmitted from the master device to the slave device, and which gives a permission of a synchronous communication for the slave device. The Req frame is a signal which is transmitted from the slave device to the master device, and which indicates the start of the synchronous communication. The Resp frame is a response reply signal which is transmitted from the master device to the slave device, and which indicates a reply to the Req frame. The FollowUP frame is a signal which is transmitted from the master device to the slave device, and which notifies the slave terminal of the sending time of the Resp frame.

The above-explained four kinds of frames are exchanged, and a transmission delay time Td in one way is calculated through the following formula (1). In this case, the calculation is performed based on a presumption that the upstream transmission delay time is consistent with the downstream transmission delay.

$$Td=\{(T2-T1)+(T4-T3)\}/2 \qquad \text{Formula (1)}$$

Based on the calculated transmission delay time (Td), a synchronization error ($\Delta T$) between the respective clock units of the protective relay devices 11-1 and 11-2 are calculated through the following formula (2).

$$\Delta T=(T2-T1)-Td \qquad \text{Formula (2)}$$

By adding or subtracting the synchronization error ($\Delta T$) calculated in this case relative to the clock unit 113, the correction completes.

Figure 4:
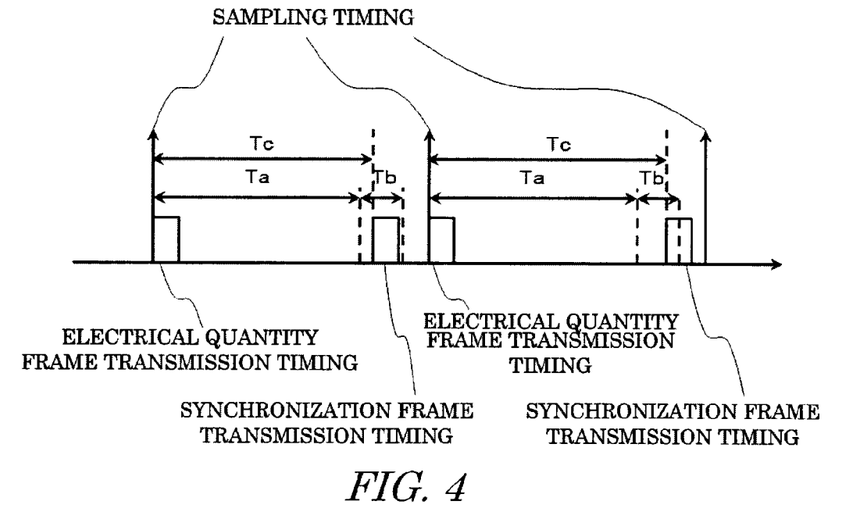
FIG. 4 is a diagram illustrating a timing at which a synchronization frame is sent according to the first embodiment.

Next, FIG. 4 illustrates a sending timing of the electrical quantity frame and that of the synchronization frame to be sent to the network 13-1 from the communication unit 115. The electrical quantity frame is immediately sent upon obtainment of the electrical quantity data, but the synchronization frame is sent within the fluctuation allowable time (Tb) after the certain period of time (Ta) from the sampling timing. This fluctuation allowable time (Tb) can be calculated from the allowable precision of the synchronous control on the protective relay devices 11-1 to 11-3, the synchronous control interval is set based on the crystal oscillator precision of the device and the necessary synchronization precision among the devices, and a time that is n times as much as the communication time of the synchronization frame to be sent is set as the fluctuation allowable time (Tb). That is, a timing (Tc) at which the synchronization timing is sent can be expressed as the following formula (3). The symbol K in this formula is a random number created by the random-number creating unit 118, and satisfies a condition $0 \leq K \leq 1$.

$$Tc=Ta+(Tb \times K) \qquad \text{Formula (3)}$$

According to this embodiment, the timing at which the synchronization frame is sent is set based on the random number set by each protective relay device. Hence, an occurrence of a transmission delay time due to the overlap of the synchronization-frame relaying process at the communication relaying devices 12-1, 12-2, etc., in the protective relay system 1 can be suppressed. That is, since the synchronization precision of the respective clock units among the protective relay devices improves, a false operation of the protective relay device can be prevented.

In addition, according to this embodiment, the fluctuation allowable time (Tb) is set as a time after a certain period of time (Ta) from the sampling time. By setting this certain period of time (Ta) to be equal to or longer than the necessary time for the sender protective relay device 11-1 to execute the sending process of the electrical quantity frame, an adverse effect of the sending process of the electrical quantity to the sending process of the synchronization frame can be reduced.

In addition, by setting the fluctuation allowable time (Tb) to be n times as much as the communication time of the synchronization frame that is periodically sent, the probability that the synchronization frame sent from the other device collides at the communication relaying device can be substantially 1/n.

Still further, the synchronization-frame processing unit 117 may store the random number created by the random-number creating unit 118, and when the same random number is sequentially obtained, the random number is obtained again. This further improves the synchronization precision among the protective relay devices 11-1 to 11-3.

Yet still further, the synchronization-frame processing unit 117 may store the transmission delay time (Td) calculated through the formula (1) in an unillustrated memory unit as needed, and may compare the minimum delay time among the past transmission delay times with the presently calculated transmission delay time (Td). When a difference between the minimum delay time and the presently calculated transmission delay time (Td) is equal to or larger than a preset threshold, the clock unit 113 is not corrected based on this transmission delay time (Td). According to this structure, it becomes possible to perform synchronous control on the clock unit without data obtained in a case in which the transmission delay time (Td) becomes longer than that of a normal status such that a transmission anomaly occurs, and thus the synchronization precision can be further improved.

When, however, the structure in which Td is stored and is compared with the minimum delay time as explained above is employed, the communication route may change due to a defect of the network and that of the communication relaying device, and the synchronous control is necessary after the communication route changes. Hence, Td that is not utilized for the correction in the above-explained case is also stored in the memory unit as a sample. The memory unit stores a certain amount of the samples of past time. If the number of samples is little, the opportunities of adopting Td containing the fluctuation in relaying delay increase, and thus the synchronization precision becomes unstable. Conversely, if the number of samples is large, a necessary time to follow up a change in the transmission delay time due to the communication route change increases. From the standpoint of the similar idea explained above, a time to follow up a change in the communication route can be determined based on the necessary synchronization precision among the devices and the synchronous control interval. Hence, the appropriate number of samples can be obtained by dividing that time period by the synchronous communication cycle.

In this embodiment, in order to simplify the explanation, the electrical quantity frame is separate data frame from the synchronization frame, but the electrical quantity frame and the synchronization frame may be the same frame, and in this case, a frame to which a synchronization flag is added is taken as the synchronization frame, and the sending timing is set based on the random number.

Figure 5:
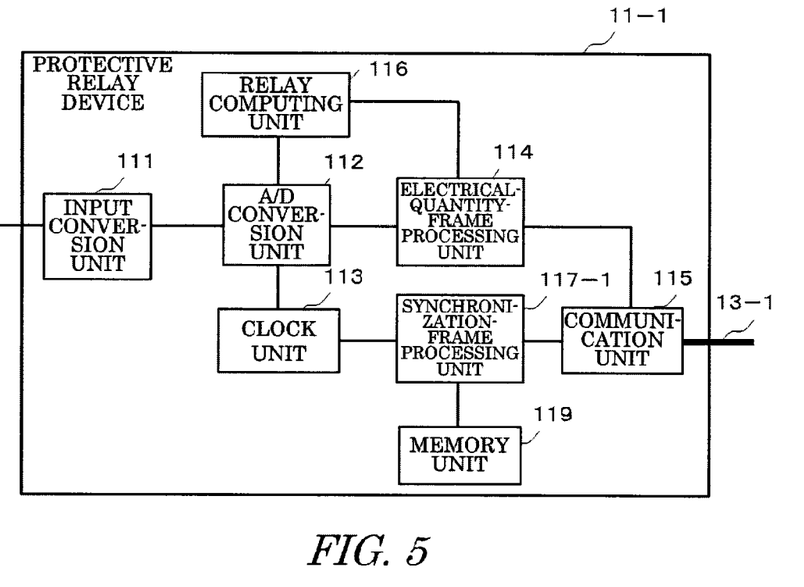
FIG. 5 is a functional block diagram illustrating an internal structure of a protective relay device according to a second embodiment.

Second Embodiment a protective relay device according to a second embodiment will be explained with reference to FIG. 5. The same structure as that of the first embodiment will be denoted by the same reference numeral, and the explanation thereof will be omitted. The difference from the first embodiment is that a memory unit 119 is provided instead of the random-number creating unit 118, and a synchronization-frame processing unit 117-1 is provided instead of the synchronization-frame processing unit 117.

The synchronization-frame processing unit 117-1 sends, to the protective relay devices 11-2 and 11-3, the synchronization frames via the communication unit 115 and the network 13-1. In this case, a timing (Tc) at which the synchronization frame is sent is within a fluctuation allowable time (Tb) after a certain period of time (Ta) from the sampling timing.

Within such a fluctuation allowable time (Tb), the synchronization frame is sent at a timing obtained by adding an addition time ($\Delta t$) to the last sending timing of the synchronization frame. That is, when the initial sending timing (Tc1) is "after a certain period of time (Ta)" from the sampling timing, the second sending timing becomes "after a certain period of time (Ta)+addition time ($\Delta t$)" from the sampling timing.

Hence, in an n-th sending (where n is a value obtained by dividing the fluctuation allowable time (Tb) by the addition time ($\Delta t$)), a sending timing (Tcn) becomes "certain period of time (Ta)+addition time ($\Delta t$)×(n−1)".

Figure 6:
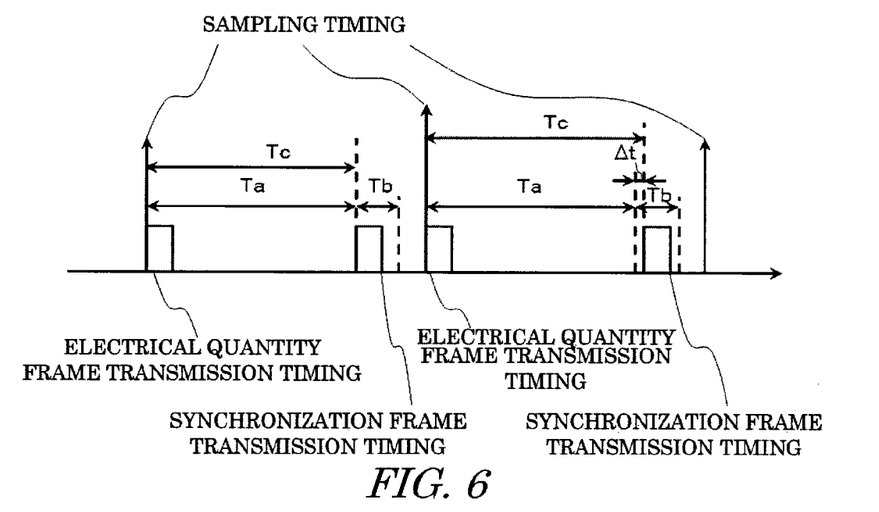
FIG. 6 is a diagram illustrating a timing at which a synchronization frame is sent according to the second embodiment.

FIG. 6 illustrates the above-explained transmission timing. The electrical quantity frame is immediately transmitted upon obtainment of the electrical quantity data, but the synchronization frame is transmitted within the fluctuation allowable time (Tb) after the certain period of time (Ta) from the sampling timing. Hence, the transmission timing is delayed by the addition time ($\Delta t$) for each transmission.

Next, the synchronization frame is sent at each sending timing (Tc), and the transmission delay time Td is calculated through the formula (1) of the first embodiment.

The memory unit 119 stores, as the minimum delay time, the minimum value among the transmission delay times calculated by the synchronization-frame processing unit 117 in past times. That is, the synchronization-frame processing unit 117 compares the presently calculated transmission delay time (Td) with the minimum delay time stored in the memory unit 119, and when the transmission delay time (Td) is smaller, the synchronization-frame processing unit updates the minimum delay time with that value. At this time, the sending timing (Tc) of the synchronization frame is also stored. That is, the sending timing of the synchronization frame at which the transmission delay time (Td) is minimized, i.e., the minimum delay time will be searched.

Next, for the timing of the synchronization frame after the (n+1)th sending in the synchronization-frame processing unit 117, the fixed sending timing which is stored in the memory unit 119 and at which the transmission delay time becomes the minimum delay time is applied.

According to this embodiment, the synchronization-frame processing unit 117 changes the sending timing of the synchronization frame by what corresponds to the addition time each time the synchronization frame is sent. This makes it possible for the synchronization-frame processing unit to set the timing at which the transmission delay time (Td) becomes the minimum. After the timing is set, by applying the minimum sending timing, an occurrence of the transmission delay time caused by the overlap of the synchronization-frame relaying process at the communication relaying devices 12-1, 12-2, etc., in the protective relay system 1 can be suppressed. That is, since the synchronization precision among the respective clock units of the protective relay devices improves, a false operation of the protective relay device can be prevented.

According to this embodiment, the transmission delay time (Td) is derived based on the network structure at the time of calculation, and the communication load. Hence, when the number of terminals increases/decreases, and the number of data frames and the length thereof, the communication cycle, and the communication form (unicast or multicast) are changed, the transmission delay time (Td) also changes. Accordingly, when there is a change relating to the communication, the minimum delay time stored in the memory unit 119 is once deleted, and the 1 to n-th operations explained above are performed again. This enables a highly precise synchronization even after the change.

In addition, the above-explained synchronization method is carried out at the initiative of the master device, and the synchronous communication is carried out using the Poll frame. Hence, the frame to be collided with the synchronization frame is limited to the frame constantly sent like the electrical quantity frame, and thus the synchronization frames sent by the respective terminals do not collide one another (adjustment among the terminals is unnecessary). However, depending on the time synchronization scheme, the above-explained method may be carried out at the initiative of the slave device. In this case, since the respective slave devices sent the synchronization frames at arbitrarily timings, the synchronization frames may collide one another. Advantages of the slave-device initiative are that the communication load can be reduced since the Poll frame is unnecessary, the synchronous communication cycle can be set in accordance with the clock precision of each slave device and the necessary synchronization precision among the respective protective relay devices since the synchronization is carried out at the initiative of the slave device (for example, a device has a low clock precision, so that synchronous communication at a cycle of 100 ms in addition to synchronization correction is necessary, but the other device has a high clock precision, so that a cycle of 10 seconds is fine).

According to this embodiment, a time period other than the period at which the electrical quantity frame, etc., is always communicated/passing through is necessary, but it is a rare case in which the synchronous communication is always performed (since the communication cycle is set in accordance with the clock precision of the device and the necessary synchronization precision). Hence, according to the slave-device initiative scheme, even if the minimum delay time is obtained like the above-explained embodiment, a collision with the synchronization frame sent by the other device may occur.

When a collision with the synchronization frame sent by the other terminal occurs, the transmission delay time (Td) to be calculated changes and becomes inconsistent with the minimum delay time. Accordingly, it is appropriate if searching is performed again like 1 to n-th operations. However, in the case of the collision of the synchronization frames, the plural devices detect the change in Td. Hence, when the respective devices perform searching again simultaneously, even if addition of the addition time is performed on the sending timing, when the synchronous communication cycle is the same, a collision occurs every time the frame is sent.

In order to address this disadvantage, it is appropriate if searching is performed again when the inconsistency with the minimum delay time continues m times. As to the setting of m, it is appropriate if a number not likely to be duplicated, such as the device number allocated to each device, or a part of the host address in the IP address, is applied, and in the case of within the same system, a preferential number may be set beforehand. As the other method, when the unit to be added to the transmission delay at the time of searching the minimum delay time through the 1 to n-th operations and the synchronous communication cycle are set based on the device number or a part of the host address so as not to duplicate among the respective devices, the continuation of the frame collision can be addressed.

Third Embodiment

Figure 7:
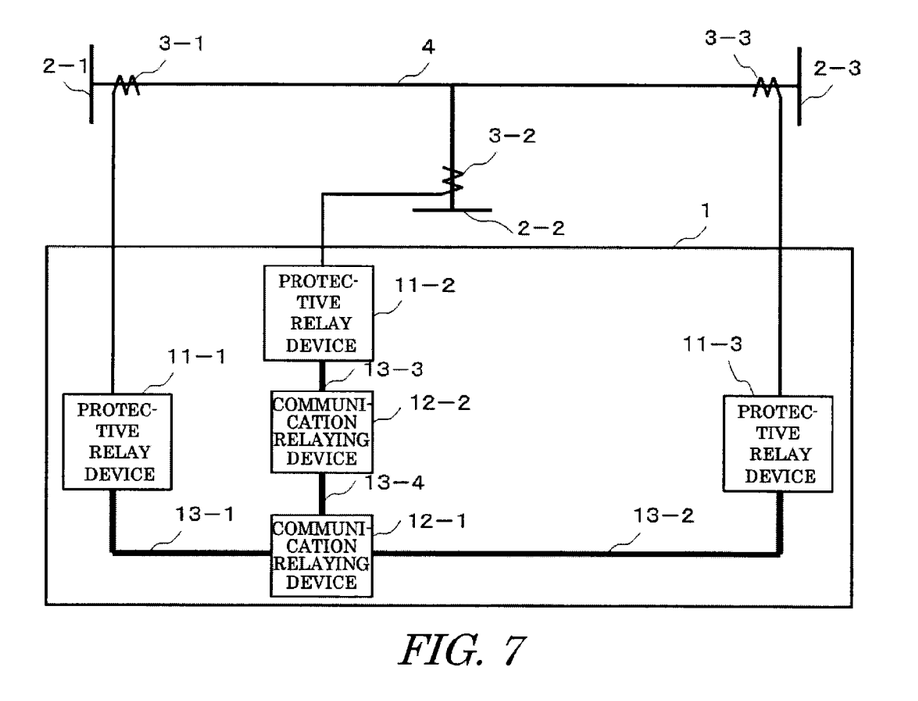
FIG. 7 is a block diagram illustrating a structure of a protective relay system according to a third embodiment.

A structure of a protective relay system according to a third embodiment of the present disclosure will be explained with reference to FIG. 7. FIG. 7 is a block diagram illustrating a protective relay system that protects a three-terminal power transmission line.

A protective relay system 1 includes the protective relay devices 11-1 to 11-3, communication relaying devices 12-1 and 12-2, and networks 13-1 to 13-4.

The protective relay devices 11-1 to 11-3 are connected to current transformers 3-1 to 3-3, respectively, provided near terminals 2-1 to 2-3, and obtain electrical quantity data. In addition, the protective relay devices 11-1 to 11-3 each perform communication via the network 13-1 to 13-4 and the communication relaying devices 12-1 and 12-2, and exchange data frame. The data frame exchanged among the protective relay devices 11-1 to 11-3 includes the electrical quantity frame containing the electrical quantity data obtained from the current transformers 3-1 to 3-3, and the synchronization frame to establish a time synchronization among the respective protective terminal devices 11-1 to 11-3.

Figure 8:
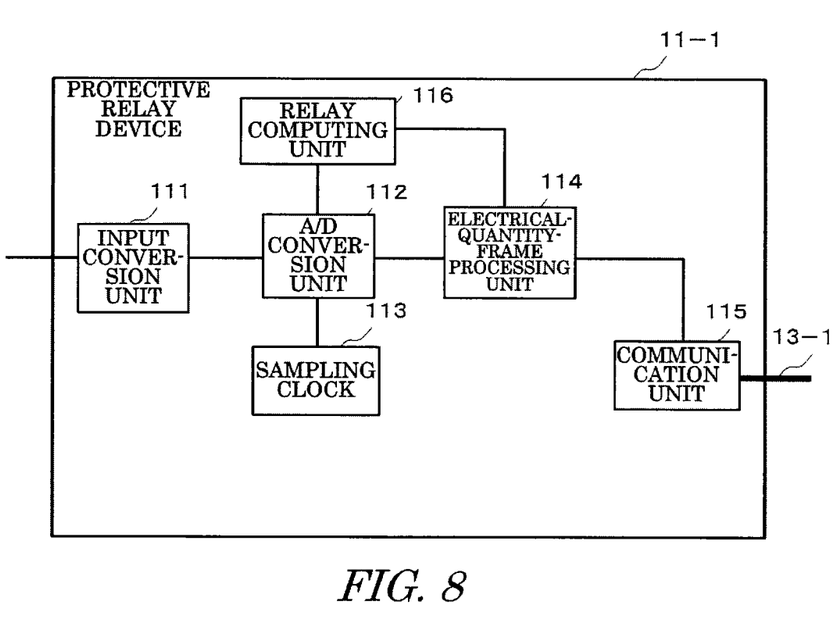
FIG. 8 is a functional block diagram illustrating an internal structure of a protective relay device according to the third embodiment.

An internal structure of the protective relay device 11-1 will be explained with reference to FIG. 8. FIG. 8 is a functional block diagram illustrating a functional structure of the protective relay device 11-1.

The protective relay device 11-1 includes an input conversion unit 111, an analog-digital conversion unit (hereinafter, referred to as an A/D conversion unit) 112, a clock unit 113, an electrical-quantity-frame processing unit 114, a communication unit 115, and a relay computing unit 116. The protective relay devices 11-2, 11-3 placed at the terminals 2-2, 2-3 both employ the same structure as that of the protective relay device 11-1. Hence, the explanation thereof will be omitted.

Analog data that is the electrical quantity data obtained from the current transformer 3-1 is input to the input conversion unit 111.

The A/D conversion unit 112 performs sampling on the electrical quantity data that is the analog data input to the input conversion unit 111 at a sampling timing clocked by the clock unit 113, and converts the analog data to digital data.

The electrical-quantity-frame processing unit 114 transmits, to the protective relay devices 11-2 and 11-3, the electrical quantity data that is converted to the digital data by the A/D converter 112 as an electrical quantity frame via the communication unit 115, the network 13-1, and other communication relaying devices. In addition, the electrical-quantity-frame processing unit 114 receives, via the network 13-1 and the communication unit 115, the electrical quantity frames that are digital data transmitted from the protective relay devices 11-2 and 11-3. The electrical quantity frames received in this case include electrical quantity data obtained from the current transformers 3-2 and 3-3 at the terminals 2-2 and 2-3.

At this time, every time the electrical quantity frame is received, a receiving time is stored, and when a time difference between the receiving time of the electrical quantity frame received last time from the same sender device and the present receiving time is equal to or larger than a threshold (K1) that is set beforehand, the electrical quantity frame received presently is discarded. That is, although the electrical quantity frame is periodically received from the protective relay device that is the same sender device, when the interval of the receiving times is equal to or larger than the threshold (K1), it is determined that an abnormal event is occurring in the network between the devices, and the electrical quantity frame transmitted under the abnormal event is discarded. In this case, the threshold K1 is defined as, for example, K1=(sending cycle of sender protective relay device)+α.

The relay computing unit 116 performs current differential computation based on the electrical quantity data of the terminal 2-1 having undergone digital conversion by the A/D conversion unit 112, and the electrical quantity data of the terminals 2-2 and 2-3 contained in the electrical quantity frames received by the electrical-quantity-frame processing unit 114.

According to this embodiment, when the interval of the receiving times of the electrical quantity frames is equal to or larger than the threshold, the electrical quantity frame is discarded. This enables a relaying computation without the use of the electrical quantity frame that has a possibility of a network abnormality like a frame collision within the network. Hence, it becomes possible to suppress a false operation of the protective relay device 11-1.

In addition, according to this embodiment, when the receiving interval of the electrical quantity frames is equal to or larger than the threshold, the frame is discarded. However, the frame to be discarded is not limited to the electrical quantity frame, and may be the synchronization frame. In this case, when the receiving interval is also equal to or larger than the threshold, the synchronization frame is discarded.

Still further, this embodiment is applicable to the case in which the sending timing of the synchronization frame is set based on the random number like the first embodiment. In this case, a threshold (K2) is defined as K2=(sending cycle of sender protective relay device)+(fluctuation allowable time (T2))+α.

According to embodiments of the present disclosure, it becomes possible to provide a protective relay system, a protective relay device, and a time synchronization method which can realize a time synchronization highly precisely between devices.

Several embodiments of the present disclosure were explained in this specification, but those embodiments are merely presented as examples, and are not intended to limit the scope and spirit of the present disclosure. The above-explained embodiments can be carried out in various other forms, and permit various omissions, replacements, and modifications without departing from the scope and spirit of the present disclosure. Such embodiments and modifications thereof are within the scope and spirit of the present disclosure, and also within an equivalent range to the subject matter as recited in appended claims.

REFERENCE SIGNS LIST

1 Protective relay system
2-1 to 2-3 Terminal
3-1 to 3-3 Current transformer
4 Power transmission line
11-1 to 11-3 Protective relay device
12-1 to 12-2 Communication relaying device
13-1 to 13-4 Network
111 Input conversion unit
112 A/D conversion unit
113 Clock unit
114 Electrical-quantity-frame processing unit
115 Communication unit
116 Relay computing unit
117 Synchronization-frame processing unit
118 Random-number creating unit

The invention claimed is:

1. A protective relay system comprising a plurality of protective relay devices that protect a power system based on electrical quantity data from the power system, a communication between the protective relay devices being performed via a network,
    the protective relay device comprising:
    a clock unit periodically clocking a timing at which sampling is performed on an electrical quantity of the power system;
    a relay computing unit performing a relay computation based on the electrical quantity data having undergone the sampling in accordance with the timing clocked by the clock unit and electrical quantity data contained in an electrical quantity frame received from another protective relay device via the network;
    a random-number creating unit creating a random number; and
    a synchronization-frame processing unit setting a timing of sending a synchronization frame to the another protective relay device via the network based on the random number created by the random-number creating unit,
    wherein when sequentially obtaining identical random numbers from the random-number creating unit, the synchronization-frame processing unit obtains again a random number, and sets the timing based on the random number obtained again.

2. The protective relay system according to claim 1, wherein the synchronization-frame processing unit sets the timing of sending the synchronization frame when a predetermined certain period of time is passed from a timing of sending the electrical quantity frame that contains the electrical quantity data having undergone the sampling.

3. The protective relay system according to claim 2, wherein the synchronization-frame processing unit sets the timing of sending the synchronization frame within a fluctuation allowable time that is set beforehand.

4. The protective relay system according to claim 1, wherein the synchronization-frame processing unit sets the timing of sending the synchronization frame within a fluctuation allowable time that is set beforehand.

5. A protective relay device comprised in the protective relay system according to claim 1.

6. The protective relay system according to claim 5, wherein the synchronization-frame processing unit sets the timing of sending the synchronization frame within a fluctuation allowable time that is set beforehand.

7. The protective relay system according to claim 1, wherein the synchronization-frame processing unit sets the timing of sending the synchronization frame when a predetermined certain period of time is passed from a timing of sending the electrical quantity frame that contains the electrical quantity data having undergone the sampling.

8. The protective relay system according to claim 1, wherein the synchronization-frame processing unit sets the timing of sending the synchronization frame within a fluctuation allowable time that is set beforehand.

* * * * *